(12) United States Patent
Boeckh et al.

(10) Patent No.: US 7,790,667 B2
(45) Date of Patent: Sep. 7, 2010

(54) WATER-SOLUBLE COPOLYMERS OF MONOETHYLENICALLY UNSATURATED POLYALKYLENE OXIDE MONOMERS AND DIPOLAR MONOMERS CONTAINING AT LEAST ONE NITROGEN ATOM

(75) Inventors: Dieter Boeckh, Limburgerhof (DE); Thomas Pfeiffer, Boehl-Iggelheim (DE); Stefan Becker, Mannheim (DE); Marcus Guzmann, Muehlhausen (DE); Pramod Kakumanu Reddy, West Chester, OH (US); John Davis Aiken, III, Loveland, OH (US)

(73) Assignee: BASF Aktiengesellschaft, Ludwigshafen (DE)

( * ) Notice: Subject to any disclaimer, the term of this patent is extended or adjusted under 35 U.S.C. 154(b) by 209 days.

(21) Appl. No.: 10/579,795

(22) PCT Filed: Nov. 16, 2004

(86) PCT No.: PCT/EP2004/012967

§ 371 (c)(1),
(2), (4) Date: May 18, 2006

(87) PCT Pub. No.: WO2005/049674

PCT Pub. Date: Jun. 2, 2005

(65) Prior Publication Data

US 2007/0149436 A1 Jun. 28, 2007

Related U.S. Application Data

(60) Provisional application No. 60/523,305, filed on Nov. 20, 2003.

(51) Int. Cl.
*C11D 3/37* (2006.01)
*C08F 220/00* (2006.01)

(52) U.S. Cl. .................. 510/475; 510/276; 510/332; 510/476; 510/500; 525/10

(58) Field of Classification Search .............. 510/276, 510/332, 475, 476, 500; 525/10
See application file for complete search history.

(56) References Cited

U.S. PATENT DOCUMENTS 6,361,768 B1 * 3/2002 Galleguillos et al. ..... 424/70.12
6,645,476 B1 * 11/2003 Morschhauser et al. .... 424/70.1

FOREIGN PATENT DOCUMENTS

| JP | 61 26608 | 2/1986 |
| JP | 11 208098 | 8/1999 |
| JP | 2001 31885 | 2/2001 |
| WO | 01 92451 | 12/2001 |

\* cited by examiner

*Primary Examiner*—Brian P Mruk
(74) *Attorney, Agent, or Firm*—Oblon, Spivak, McClelland, Maier & Neustadt, L.L.P.

(57) ABSTRACT

Water-soluble copolymers which comprise, in copolymerized form,
(a) 60 to 99% by weight of at least one monoethylenically unsaturated polyalkylene oxide monomer of the formula I $$H_2C=CR^1-X-Y-(R^2-O)_n R^3 \quad \text{I}$$

in which the variables have the following meanings:
X is $-CH_2-$ or $-C(O)-$, if Y is $-O-$;
  is $-C(O)-$, if Y is $-NH-$;
  is $-O-$ or $-O-(CH_2)_4-$, if Y is a chemical bond;
Y is $-O-$, $-NH-$ or a chemical bond;
$R^1$ is hydrogen or methyl;
$R^2$ is $C_2$-$C_4$-alkylene radicals, which may be identical or different and also linear or branched, but where at least 50% of the radicals $R^2$ are ethylene;
$R^3$ is $C_1$-$C_{22}$-alkyl, phenyl, p-($C_1$-$C_{12}$-alkyl)phenyl or hydrogen;
n is an integer from 6 to 50,
(b) 1 to 40% by weight of at least one nonquaternized dipolar monomer comprising at least one nitrogen atom,
(c) 0 to 39% by weight of other nonionic monoethylenically unsaturated monomers and
(d) 0 to 10% by weight of other anionic monoethylenically unsaturated monomers
and have an average molecular weight $M_w$ of from 2000 to 500 000 D,
and the use of the copolymers as dispersants and sequestrants for pigmented materials, as additive for detergents, laundry pretreatment compositions, cleaners for hard surfaces, dentifrices and bodycare compositions, and as auxiliaries for textile processes, paper making and paper processing and deinking processes.

12 Claims, No Drawings

WATER-SOLUBLE COPOLYMERS OF MONOETHYLENICALLY UNSATURATED POLYALKYLENE OXIDE MONOMERS AND DIPOLAR MONOMERS CONTAINING AT LEAST ONE NITROGEN ATOM

This application claims priority to Provisional Application No. 60/523,305, filed Nov. 20, 2003.

BACKGROUND OF THE INVENTION

1. Field of the Invention

The present invention relates to novel water-soluble copolymers which comprise, in copolymerized form,
(a) 60 to 99% by weight of at least one monoethylenically unsaturated polyalkylene oxide monomer of the formula I $$H_2C=CR^1-X-Y-(R^2-O)_n R^3 \qquad I$$

in which the variables have the following meanings:
X is —$CH_2$— or —C(O)—, if Y is —O—;
is —C(O)—, if Y is —NH—;
is —O— or —O—$(CH_2)_4$—, if Y is a chemical bond;
Y is —O—, —NH— or a chemical bond;
$R^1$ is hydrogen or methyl;
$R^2$ is $C_2$-$C_4$-alkylene radicals, which may be identical or different and also linear or branched, but where at least 50% of the radicals $R^2$ are ethylene;
$R^3$ is $C_1$-$C_{22}$-alkyl, phenyl, p-($C_1$-$C_{12}$-alkyl)phenyl or hydrogen;
n is an integer from 6 to 50,
(b) 1 to 40% by weight of at least one nonquaternized dipolar monomer comprising at least one nitrogen atom,
(c) 0 to 39% by weight of other nonionic monoethylenically unsaturated monomers and
(d) 0 to 10% by weight of other anionic monoethylenically unsaturated monomers
and have an average molecular weight $M_w$ of from 2000 to 500 000 D.

In addition, the invention relates to the use of these copolymers as dispersants and sequestrants for pigmented materials, as additive for detergents, laundry pretreatment agents, cleaners for hard surfaces, dentifrices and bodycare compositions, and as auxiliaries for textile processing, paper making and paper processing and deinking processes.

Last but not least, the invention relates to detergent formulations which comprise these copolymers.

2. Description of the Background

Pigment-containing soilings, in particular those caused by the color-imparting components of tea, coffee and also grass, can usually only be removed with difficulty from textile and hard surfaces. This problem also arises in the area of dental care. In addition, the removal of pigmented materials from substrates is also of importance in industrial processes, such as textile processing, paper making and paper processing, and deinking processes. The compositions used hitherto for these purposes are generally unsatisfactory.

JP-A-1999/208098 describes the use of copolymers of N-vinylimidazoles and methylpolyethylene glycol (meth) acrylates which comprise, in copolymerized form, 90 to 95 mol % of the N-vinylimidazole monomer, as dye receptor for the coating of inkjet papers.

JP-A-1986/26608 discloses aqueous pigment dispersions for paints which comprise, as dispersant, copolymers of 48 or 46% by weight of polyethylene glycol methacrylate or polypropylene glycol methacrylate, 50% by weight of N-vinylpyrrolidone or N-vinylimidazole and additionally 2 or 4% by weight, respectively, of (meth)acrylic monomers comprising quaternary ammonium groups.

JP-A-2001/31885 also describes dispersants for pigments which represent copolymers of N,N-dimethylaminopropylacrylamide or N-vinylimidazole, methylpolyethylene glycol methacrylate and 65 or 75% by weight, based on the respective copolymer, of a macromonomer based on polymethyl methacrylate or a methyl methacrylate/2-hydroxyethyl methacrylate copolymer each with a terminal methacryloyl group.

SUMMARY OF THE INVENTION

It is an object of the present invention to provide polymers which are suitable as dispersants for pigment-containing soiling.

We have found that this object is achieved by water-soluble copolymers which comprise, in copolymerized form,
(a) 60 to 99% by weight of at least one monoethylenically unsaturated polyalkylene oxide monomer of the formula I $$H_2C=CR^1-X-Y-(R^2-O)_n R^3 \qquad I$$

in which the variables have the following meanings:
X is —$CH_2$— or —C(O)—, if Y is —O—;
is —C(O)—, if Y is —NH—;
is —O— or —O—$(CH_2)_4$—, if Y is a chemical bond;
Y is —O—, —NH— or a chemical bond;
$R^1$ is hydrogen or methyl;
$R^2$ is $C_2$-$C_4$-alkylene radicals, which may be identical or different and also linear or branched, but where at least 50% of the radicals $R^2$ are ethylene;
$R^3$ is $C_1$-$C_{22}$-alkyl, phenyl, p-($C_1$-$C_{12}$-alkyl)phenyl or hydrogen;
n is an integer from 6 to 50,
(b) 1 to 40% by weight of at least one nonquaternized, nitrogen-containing dipolar monomer,
(c) 0 to 39% by weight of other nonionic monoethylenically unsaturated monomers and
(d) 0 to 10% by weight of other anionic monoethylenically unsaturated monomers
and have an average molecular weight $M_w$ of from 2000 to 500 000 D.

DETAILED DESCRIPTION OF THE PREFERRED EMBODIMENTS

Preferred copolymers according to the invention comprise, as copolymerized component (a), monoethylenically unsaturated polyalkylene oxide monomers of the formula I in which the variables have the following meanings:
X is —C(O)—;
Y is —NH— and especially —O—;
$R^1$ is hydrogen and especially methyl;
$R^2$ is $C_2$-$C_4$-alkylene radicals, which may be identical or different and also linear or branched, but where at least 70%, in particular at least 85%, of the radicals $R^2$ are ethylene; $R^2$ is particularly preferably ethylene;
$R^3$ is $C_1$-$C_4$-alkyl or hydrogen, in particular hydrogen and especially methyl;
n is an integer from 8 to 35, especially 10 to 30 and particularly preferably 15 to 25.

Corresponding to formula I, the monomers (a) are, for example,
reaction products of (meth)acrylic acid with polyalkylene glycols which are not terminally capped, terminally capped at one end by alkyl, phenyl or alkylphenyl radicals, aminated at one end or terminally capped at one end by alkyl, phenyl or alkylphenyl radicals and aminated at one end, thus (meth)acrylic esters ((meth)acrylates) and (meth)acrylamides;

vinyl ethers of polyalkylene glycols which are not terminally capped or terminally capped at one end by alkyl, phenyl or alkylphenyl radicals;

allyl ethers of polyalkylene glycols which are not terminally capped or terminally capped at one end by alkyl, phenyl or alkylphenyl radicals.

The (meth)acrylamides are preferred monomers (a) and the acrylates and especially the methacrylates are particularly preferred monomers (a) here.

Particularly suitable examples of the monomers (a) which may be mentioned are:

methylpolyethylene glycol (meth)acrylate and (meth)acrylamide, methylpoly(propylene oxide-co-ethylene oxide) (meth)acrylate and (meth)acrylamide, ethylpolyethylene glycol (meth)acrylate and (meth)acrylamide and ethylpoly(propylene oxide-co-ethylene oxide) (meth)acrylate and (meth)acrylamide, each with 6 to 50, preferably 8 to 35, particularly preferably 10 to 30 and very particularly preferably 15 to 25, alkylene oxide units, where methylpolyethylene glycol acrylate is preferred and methylpolyethylene glycol methacrylate is particularly preferred;

polyethylene glycol monovinyl ether, methylpolyethylene glycol monovinyl ether and mono(vinyloxybutyl) polyethylene glycol, each having 6 to 50, preferably 8 to 35, particularly preferably 10 to 30 and very particularly preferably 15 to 25, alkylene oxide units;

polyethylene glycol monoallyl ether and methylpolyethylene glycol monoallyl ether, each with 6 to 50, preferably 8 to 35, particularly preferably 10 to 30 and very particularly preferably 15 to 25, alkylene oxide units.

The proportion of monomers (a) in the copolymers according to the invention is 60 to 99% by weight, preferably 70 to 97% by weight, particularly preferably 80 to 96% by weight and very particularly preferably 90 to 95% by weight.

Monomers (b) which are particularly suitable for the copolymers according to the invention are N-vinyllactams, N-vinylimidazoles, vinylpyridines, N-vinylamides and basic esters and amides of ethylenically unsaturated carboxylic acids.

Specific examples of particularly suitable monomers (b) which may be mentioned are:

N-vinyllactams of lactams with 5- to 7-membered rings, such as N-vinyl-pyrrolidone, N-vinylcaprolactam and N-vinyloxazolidone;

N-vinylimidazoles, i.e. N-vinylimidazole itself and its derivatives, in particular $C_1$-$C_5$-alkyl derivatives, such as N-vinyl-2-methylimidazole, N-vinyl4-methylimidazole, N-vinyl-5-methylimidazole, N-vinyl-2-ethylimidazole, N-vinylimidazoline, N-vinyl-2-methylimidazoline and N-vinyl-2-ethylimidazoline;

vinylpyridines, such as 4-vinylpyridine and 2-vinylpyridine;

N-vinylamides of saturated $C_1$-$C_{18}$-carboxylic acids, such as N-vinylformamide and N-vinylacetamide;

basic esters of ethylenically unsaturated carboxylic acids, in particular the esters of α,β-unsaturated $C_3$-$C_6$-monocarboxylic acids, especially acrylic acid and methacrylic acid, with amino alcohols, especially N,N-di($C_1$-$C_4$-alkyl)amino-$C_2$-$C_6$-alcohols, such as dimethylaminoethyl acrylate, dimethylaminoethyl methacrylate, dimethylaminopropyl acrylate, dimethylaminopropyl methacrylate, diethylaminoethyl acrylate, diethylaminopropyl acrylate, dimethylaminobutyl acrylate and diethylaminobutyl acrylate;

basic amides of ethylenically unsaturated carboxylic acids, in particular the N,N-di($C_1$-$C_4$-alkyl)amino($C_2$-$C_6$-alkyl)amides of α,β-unsaturated $C_3$-$C_6$-monocarboxylic acids, especially acrylic acid and methacrylic acid, such as dimethylaminoethylacrylamide, dimethylaminoethylmethacrylamide, diethylaminoethylacrylamide, diethylaminoethylmethacrylamide, dimethylaminopropylacrylamide, dimethylaminopropylmethacrylamide, diethylaminopropylacrylamide and diethylaminopropylmethacrylamide.

Preferred monomers (b) are N-vinylpyrrolidone, N-vinylcaprolactam, N-vinylimidazole, 4-vinylpyridine, N-vinylformamide and basic (meth)acrylic esters and (meth)acrylamides, in particular N,N-di($C_1$-$C_4$-alkyl)aminoethyl (meth)acrylates, N,N-di($C_1$-$C_4$-alkyl)aminoethyl(meth)acrylamides, N,N-di($C_1$-$C_4$-alkyl)aminopropyl (meth)acrylates and N,N-di($C_1$-$C_4$-alkyl)aminopropyl(meth)acrylamides, among which N,N-dimethylaminoethyl (meth)acrylate and N,N-dimethylaminopropyl(meth)acrylamide are particularly emphasized.

Particularly preferred monomers (b) are N-vinylpyrrolidone, N-vinylimidazole and combinations of N-vinylpyrrolidone and N-vinylimidazole.

The proportion of monomers (b) in the copolymers according to the invention is 1 to 40% by weight, preferably 2 to 30% by weight, particularly preferably 4 to 20% by weight and very particularly preferably 5 to 15% by weight.

As optional component (c), the copolymers according to the invention may comprise nonionic monoethylenically unsaturated monomers.

Suitable monomers (c) are, for example, esters of monoethylenically unsaturated $C_3$-$C_6$-carboxylic acids, especially acrylic acid and methacrylic acid, with monohydric $C_1$-$C_{22}$-alcohols, in particular $C_1$-$C_{16}$-alcohols; and hydroxyalkyl esters of monoethylenically unsaturated $C_3$-$C_6$-carboxylic acids, especially acrylic acid and methacrylic acid, with dihydric $C_2$-$C_4$-alcohols, such as methyl (meth)acrylate, ethyl (meth)acrylate, n-butyl (meth)acrylate, sec-butyl (meth)acrylate, tert-butyl (meth)acrylate, ethylhexyl (meth)acrylate, hydroxyethyl (meth)acrylate and hydroxypropyl (meth)acrylate;

amides of monoethylenically unsaturated $C_3$-$C_6$-carboxylic acids, especially acrylic acid and methacrylic acid, with primary and secondary $C_1$-$C_{12}$-amines, such as (meth)acrylamide, N-methyl(meth)acrylamide, N-isopropyl(meth)acrylamide and N-butyl(meth)acrylamide;

vinyl esters of saturated $C_1$-$C_{18}$-carboxylic acids, such as vinyl acetate and vinyl propionate, aliphatic and aromatic olefins, such as ethylene, propylene, $C_4$-$C_{24}$-α-olefins, in particular $C_4$-$C_{16}$-α-olefins, e.g. butylene, isobutylene, diisobutene, styrene and α-methylstyrene, and also diolefins with an active double bond, e.g. butadiene;

unsaturated nitriles, such as acrylonitrile and methacrylonitrile.

Suitable monomers (c) are ($C_1$-$C_{16}$-alkyl) (meth)acrylates, vinyl acetate, vinyl propionate, $C_4$-$C_{16}$-α-olefins, styrene and (meth)acrylonitrile.

Particularly preferred monomers (c) are methyl (meth)acrylate, ethyl (meth)acrylate, n-butyl acrylate, tert-butyl acrylate and vinyl acetate.

Very particularly preferred monomers (c) are methyl acrylate, ethyl acrylate, methyl methacrylate and vinyl acetate.

If the monomers (c) are present in the copolymers according to the invention, then their proportion can be up to 39% by weight, preferably from 2.5 to 25% by weight, particularly preferably from 5 to 15% by weight.

In addition, the copolymers according to the invention can comprise, as optional component (d), anionic monoethylenically unsaturated monomers.

Suitable monomers (d) are, for example,

α,β-unsaturated monocarboxylic acids which preferably have 3 to 6 carbon atoms, such as acrylic acid, methacrylic acid, ethacrylic acid, crotonic acid and vinylacetic acid, and alkali metal and ammonium salts thereof;

unsaturated dicarboxylic acids which preferably have 4 to 6 carbon atoms, such as itaconic acid and maleic acid, anhydrides thereof, such as maleic anhydride, and alkali metal and ammonium salts thereof;

monoesters of unsaturated dicarboxylic acid with $C_1$-$C_6$-alcohols, such as itaconic and maleic monoesters;

ethylenically unsaturated sulfonic acids, such as vinylsulfonic acid, acrylamidopropanesulfonic acid, methallylsulfonic acid and m- and p-styrenesulfonic acid;

ethylenically unsaturated phosphonic acids, such as vinylphosphonic acid and m- and p-styrenephosphonic acid.

Preferred monomers (d) are acrylic acid, methacrylic acid and maleic acid.

Particularly preferred monomers (d) are acrylic acid and methacrylic acid.

The proportion of monomers (d) in the polymers according to the invention can be up to 10% by weight, preferably from 0.1 to 5% by weight, particularly preferably from 0.5 to 2.5% by weight.

The copolymers according to the invention have an average molecular weight $M_w$ of from 2000 to 500 000 D, preferably from 2000 to 250 000 D, particularly preferably from 2500 to 100 000 D and very particularly preferably from 4000 to 60 000 D.

The K value of the copolymers according to the invention is usually 8 to 70, in particular 10 to 50, especially 12 to 40 (measured in 1% strength by weight aqueous solution at 25° C., in accordance with H. Fikentscher, Cellulose-Chemie, Volume 13, pages 58-64 and 71-74 (1932)).

The copolymers according to the invention can be prepared by free-radical polymerization of monomers (a) and (b), and if desired (c) and/or (d).

If the copolymers according to the invention are to be based on (meth)acrylic esters or (meth)acrylamides (a), it is, however, also possible, for example, to polymerize (meth)acrylic acid in an amount equivalent to the molar amount of monomer (a) with the monomer (b), and if desired (c) and/or (d), and then esterify or aminate the copolymer formed with polyalkylene glycols which are not terminally capped, terminally capped at one end by alkyl, phenyl or alkylphenyl radicals or aminated at one end or terminally capped at one end by alkyl, phenyl or alkylphenyl radicals and aminated at one end.

The free-radical polymerization of the monomers can be carried out in accordance with all known methods, preference being given to the processes of solution polymerization and of emulsion polymerization.

The polymerization is advantageously carried out in water. It is, however, also possible to use mixtures of water and organic solvents or organic solvents on their own as reaction medium.

Examples of suitable organic solvent are aliphatic and cycloaliphatic monohydric alcohols, such as methanol, ethanol, n-propanol, isopropanol, n-butanol, sec-butanol, tert-butanol, n-hexanol and cyclohexanol, polyhydric alcohols, e.g. glycols, such as ethylene glycol, propylene glycol and butylene glycol, and glycerol, alkyl ethers of polyhydric alcohols, e.g. methyl and ethyl ethers of said dihydric alcohols, and ether alcohols, such as diethylene glycol and triethylene glycol, and cyclic ethers, such as dioxane.

Suitable polymerization initiators are compounds which decompose thermally or photochemically (photoinitiators) to form free radicals.

Among the thermally activatable polymerization initiators, preference is given to initiators with a decomposition temperature in the range from 20 to 180° C., in particular from 50 to 90° C. Examples of particularly preferred thermal initiators are inorganic peroxo compounds, such as peroxodisulfates (ammonium and, preferably, sodium peroxodisulfate), peroxosulfates, percarbonates and hydrogen peroxide; organic peroxo compounds, such as diacetyl peroxide, di-tert-butyl peroxide, diamyl peroxide, dioctanoyl peroxide, didecanoyl peroxide, dilauroyl peroxide, dibenzoyl peroxide, bis(o-toloyl) peroxide, succinyl peroxide, tert-butyl peracetate, tert-butyl permaleate, tert-butyl perisobutyrate, tert-butyl perpivalate, tert-butyl peroctoate, tert-butyl perneodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azo compounds, such as 2,2'-azobisisobutyronitile, 2,2'-azobis-(2-methylbutyronitrile) and azobis(2-amidinopropane) dihydrochloride.

Examples of suitable photoinitiators are benzophenone, acetophenone, benzoin ether, benzyl dialkyl ketones and derivatives thereof.

Depending on the requirements of the material to be polymerized, the polymerization initiators are usually used in amounts of from 0.01 to 15% by weight, preferably 0.5 to 5% by weight, in each case based on the monomers to be polymerized, and can be used individually, or to exploit advantageous synergistic effects, in combination with one another.

To limit the molar masses of the copolymers according to the invention, customary regulators can be added during the polymerization, e.g. mercapto compounds, such as mercaptoethanol, thioglycolic acid and sodium disulfite. Suitable amounts of regulator are generally 0.01 to 5% by weight, based on the monomers to be polymerized.

The polymerization temperature is generally 10 to 200° C., especially 40 to 140° C., in particular 50 to 120° C.

The polymerization can be carried out under atmospheric pressure, although it is preferably carried out in a closed system under the autogenous pressure which develops.

The copolymers according to the invention are excellently suitable for the dispersion and sequestering of particulate and soluble pigmented materials in aqueous media, in particular pigment-containing soiling, as is caused, for example, by the coloring constituents of tea, coffee, red wine, fruit and fruit juices, vegetables and grass and cosmetic products.

For this purpose, the copolymers according to the invention can be used in detergents, laundry pretreatment agents and cleaning compositions, and also in dentifrices and bodycare compositions. They are also suitable as auxiliaries for industrial processes, such as textile processing, paper making and paper processing and deinking processes.

Of very particular importance is the use of the copolymers according to the invention in detergents and cleaning compositions for the removal of pigmented soiling from all types of surfaces. Usually, the copolymers are added to these compositions in amounts of from 0.05 to 10% by weight.

The surfaces to be treated may be structured or porous surfaces, but also smooth, slightly structured surfaces of flexible or hard materials.

Structured and porous surfaces may here be formed from fiber-based materials (fibers, yarns, wovens, nonwovens, etc.) or of porous macroscopic materials.

Examples of fiber-based materials are textiles and textile surfaces, i.e. all types of fiber-based fabric, in particular clothing and decoration materials, covers, such as furniture covers, and coverings, such as carpets, made of synthetic fibers, such as polyester, polypropylene and polyamide, natural fibers, such as cotton, wool and silk, and/or modified natural fibers, such as modified cotton, e.g. viscose, and made of blends of the abovementioned fibers, such as cotton blends, e.g. cotton/polyester and cotton/polyamide blends.

Examples of porous materials are leather, preferably leathers with no or only little surface treatment, such as suede, and leather objects, e.g. leather clothing, leather shoes and leather furniture.

Further examples of porous materials are wood, preferably woods with no or only little surface treatment, and wooden objects, e.g. uncoated furniture, open-pored wooden wall and floor coverings and construction timber in the building trade, and porous building materials, such as exposed concrete, aerated concrete, plasters, unglazed ceramics, tiles and porous materials, e.g. sandstone.

Examples of smooth, slightly structured surfaces are surfaces made of: plastics and plastic or synthetic resin coatings, e.g. furniture, facade claddings, automobiles, dishes made of polypropylene, polyvinyl chloride or polymethyl methacrylate and floor coverings made of polyvinyl chloride, polypropylene or linoleum;

glass, e.g. plate glass, glazed ceramics, bottles and glassware;

stone, e.g. stone slabs and stone facade cladding;

metal, e.g. unpainted visible sheet claddings, pig iron and aluminum structures and galvanized and chrome-plated surfaces;

porcelain, e.g. dishes and sanitary ceramics;

teeth;

closed-pore-treated woods and leather, e.g. surface-treated wooden furniture and parquet flooring and furniture covering, shoes and clothing made of surface-treated leathers;

paints and coatings on a very wide variety of substrates, e.g. painted automobiles, wall paints and varnished or painted furniture.

Said surfaces may be treated by washing or cleaning. It may frequently be expedient in this connection to firstly pretreat the surfaces, e.g. by soaking or spraying. For example, it is particularly advantageous, to remove stubborn pigment-containing soiling from textile materials, to soak the soiling marks initially for a period of from 5 min to 24 h with a liquid detergent, a special laundry pretreatment composition or concentrated solutions of a detergent powder, each of which comprises the copolymers according to the invention, and then to wash the textile materials with the same detergent or with another detergent.

Liquid detergent formulations according to the invention comprise, in particular, the following components:
(A) 0.05 to 10% by weight of at least one copolymer according to the invention,
(B) 0.5 to 40% by weight of at least one nonionic, anionic and/or cationic surfactant,
(C) 0 to 20% by weight of an inorganic builder,
(D) 0 to 10% by weight of an organic cobuilder,
(E) 0 to 60% by weight of other customary ingredients, sodium carbonate, enzymes, perfumes, complexing agents, corrosion inhibitors, bleaches, bleach activators, bleach catalysts, color transfer inhibitors, graying inhibitors, soil release polyesters, fiber and color protection additives, silicones, dyes, bactericides, organic solvents, solubility promoters, hydrotropes, thickeners and/or alkanolamines and
(F) 0 to 99.45% by weight of water.

Solid detergent formulations according to the invention preferably have the following composition:
(A) 0.05 to 10% by weight of at least one copolymer according to the invention,
(B) 0.5 to 40% by weight of at least one nonionic, anionic and/or cationic surfactant,
(C) 0.5 to 50% by weight of an inorganic builder,
(D) 0 to 10% by weight of an organic cobuilder and
(E) 0 to 60% by weight of other customary ingredients, such as extenders, enzymes, perfume, complexing agents, corrosion inhibitors, bleaches, bleach activators, bleach catalysts, color transfer inhibitors, graying inhibitors, soil release polyesters, fiber and color protection additives, silicones, dyes, bactericides, dissolution improvers and/or disintegrants, where the sum of components (A) to (E) is 100% by weight.

The solid detergent formulations according to the invention may be in powder form, granule form, extrudate form or tablet form.

Suitable nonionic surfactants (b) are especially:

Alkoxylated $C_8$-$C_{22}$ alcohols, such as fatty alcohol alkoxylates, oxo alcohol alkoxylates and Guerbet alcohol ethoxylates: the alkoxylation can be carried out with ethylene oxide, propylene oxide and/or butylene oxide. Block copolymers or random copolymers may be present. Per mole of alcohol, they usually comprise 2 to 50 mol, preferably 3 to 20 mol, of at least one alkylene oxide. A preferred alkylene oxide is ethylene oxide. The alcohols preferably have 10 to 18 carbon atoms.

Alkylphenol alkoxylates, in particular alkylphenol ethoxylates, which comprise $C_6$-$C_{14}$-alkyl chains and 5 to 30 mol of alkylene oxide/mol.

Alkyl polyglucosides which comprise $C_8$-$C_{22}$—, preferably $C_{10}$-$C_{18}$—, alkyl chains and usually 1 to 20, preferably 1.1 to 5, glucoside units.

N-Alkylglucamides, fatty acid amide alkoxylates, fatty acid alkanolamide alkoxylates, and block copolymers of ethylene oxide, propylene oxide and/or butylene oxide.

Suitable anionic surfactants are, for example:

Sulfates of (fatty) alcohols having 8 to 22, preferably 10 to 18, carbon atoms, in particular $C_9$-$C_{11}$-alcohol sulfates, $C_{12}$-$C_{14}$-alcohol sulfates, $C_{12}$-$C_{18}$-alcohol sulfates, lauryl sulfate, cetyl sulfate, myristyl sulfate, palmityl sulfate, stearyl sulfate and tallow fatty alcohol sulfate.

Sulfated alkoxylated $C_8$-$C_{22}$-alcohols (alkyl ether sulfates): compounds of this type are prepared, for example, by firstly alkoxylating a $C_8$-$C_{22}$—, preferably a $C_{10}$-$C_{18}$—, alcohol, e.g. a fatty alcohol, and then sulfating the alkoxylation product. For the alkoxylation, preference is given to using ethylene oxide.

Linear $C_8$-$C_{20}$-alkylbenzenesulfonate (LAS), preferably linear $C_9$-$C_{13}$-alkylbenzenesulfonates and -alkyltoluenesulfonates.

Alkanesulfonates, in particular $C_8$-$C_{24}$—, preferably $C_{10}$-$C_{18}$—, alkanesulfonates.

Soaps, such as the Na and K salts of $C_8$-$C_{24}$-carboxylic acids.

The anionic surfactants are added to the detergent preferably in the form of salts. Suitable salts in this connection are, for example, alkali metal salts, such as sodium, potassium and lithium salts, and ammonium salts, such as hydroxyethylammonium, di(hydroxyethyl)ammonium and tri(hydroxyethyl) ammonium salts.

Particularly suitable cationic surfactants which may be mentioned are:

$C_7$-$C_{25}$-alkylamines;

N,N-dimethyl-N-(hydroxy-$C_7$-$C_{25}$-alkyl)ammonium salts;

mono- and di-($C_7$-$C_{25}$-alkyl)dimethylammonium compounds quaternized with alkylating agents;

ester quats, in particular quaternary esterified mono-, di- and trialkanolamines esterified with $C_8$-$C_{22}$-carboxylic acids;

imidazoline quats, in particular 1-alkylimidazolinium salts of the formulae II or III

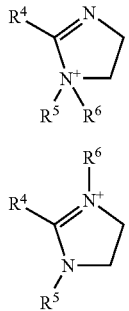

in which the variables have the following meanings:

$R^4$ is $C_1$-$C_{25}$-alkyl or $C_2$-$C_{25}$-alkenyl;

$R^5$ is $C_1$-$C_4$-alkyl or hydroxy-$C_1$-$C_4$-alkyl;

$R^6$ is $C_1$-$C_4$-alkyl, hydroxy-$C_1$-$C_4$-alkyl or a radical $R^4$—(CO)—X—(CH$_2$)$_p$— (X: —O— or —NH—; p: 2 or 3), where at least one radical $R^4$ is $C_7$-$C_{22}$-alkyl.

Suitable inorganic builders are, in particular:

Crystalline and amorphous alumosilicates with ion-exchanging properties, such as, in particular, zeolites: various types of zeolites are suitable, in particular the zeolites A, X, B, P, MAP and HS in their Na form or in forms in which Na is partially exchanged for other cations such as Li, K, Ca, Mg or ammonium.

Crystalline silicates, such as, in particular, disilicates and phyllosilicates, e.g. δ- and β-Na$_2$Si$_2$O$_5$. The silicates can be used in the form of their alkali metal, alkaline earth metal or ammonium salts, preference being given to the Na, Li and Mg silicates.

Amorphous silicates, such as sodium metasilicate and amorphous disilicate.

Carbonates and hydrogen carbonates: these can be used in the form of their alkali metal, alkaline earth metal or ammonium salts. Preference is given to Na, Li and Mg carbonates and hydrogen carbonates, in particular sodium carbonate and/or sodium hydrogen carbonate.

Polyphosphates, such as pentasodium triphosphate.

Suitable organic cobuilders are, in particular:

Low molecular weight carboxylic acids, such as citric acid, hydrophobically modified citric acid, e.g. agaric acid, malic acid, tartaric acid, gluconic acid, glutaric acid, succinic acid, imidodisuccinic acid, oxydisuccinic acid, propanetricarboxylic acid, butanetetracarboxylic acid, cyclopentanetetracarboxylic acid, alkyl- and alkenyl-succinic acids and aminopolycarboxylic acids, e.g. nitrilotriacetic acid, β-alaninediacetic acid, ethylenediaminetetraacetic acid, serinediacetic acid, isoserinediacetic acid, N-(2-hydroxyethyl)iminodiacetic acid, ethylenediaminedisuccinic acid and methyl- and ethylglycinediacetic acid.

Oligomeric and polymeric carboxylic acids, such as homopolymers of acrylic acid and aspartic acid, oligomaleic acids, copolymers of maleic acid with acrylic acid, methacrylic acid or $C_2$-$C_{22}$-olefins, e.g. isobutene or long-chain α-olefins, vinyl $C_1$-$C_8$-alkyl ethers, vinyl acetate, vinyl propionate, (meth)acrylic esters of $C_1$-$C_8$-alcohols and styrene. Preference is given to the homopolymers of acrylic acid and copolymers of acrylic acid with maleic acid. The oligomeric and polymeric carboxylic acids are used in acid form or as sodium salt.

Suitable bleaches are, for example, adducts of hydrogen peroxide onto inorganic salts, such as sodium perborate monohydrate, sodium perborate tetrahydrate and sodium carbonate perhydrate, and percarboxylic acids, such as phthalimidopercaproic acid.

Suitable bleach activators are, for example, N,N,N',N'-tetraacetylethylenediamine (TAED), sodium p-nonanoyloxybenzenesulfonate and N-methylmorpholinium acetonitrile methylsulfate.

Enzymes preferably used in detergents are proteases, lipases, amylases, cellulases, oxidases and peroxidases.

Suitable color transfer inhibitors are, for example, homopolymers, copolymers and graft polymers of 1-vinylpyrrolidone, 1-vinylimidazole or 4-vinylpyridine N-oxide. Homopolymers and copolymers of 4-vinylpyridine reacted with chloroacetic acid are also suitable as color transfer inhibitors.

Detergent ingredients are otherwise generally known. Detailed descriptions are given, for example, in WO-A-99/06524 and 99/04313; in Liquid Detergents, Editor: Kuo-Yann Lai, Surfactant Sci. Ser., Vol. 67, Marcel Decker, New York, 1997, pp. 272-304.

EXAMPLES

I. Preparation of Copolymers According to the Invention

Copolymer 1

A mixture of 610 g of water and 23.7 g of N-vinylimidazole was initially introduced into a 2 l polymerization vessel fitted with stirrer, reflux condenser, internal thermometer and 3 dropping funnels and, after flushing with nitrogen, heated to 80° C. 176.3 g of methylpolyethylene glycol methacrylate ($M_n$ 350) (feed 1), 100 g of a 4% strength by weight aqueous sodium disulfite solution (feed 2) and an initiator mixture of 4.0 g of 2,2'-azobis(2-amidinopropane) dihydrochloride and 80 g of water (feed 3) were then continuously added dropwise (feed 1 and 2 in 3 h, feed 3 in 4 h). When the initiator addition was complete, the reaction mixture was stirred for a further 1 h at 80° C., then another initiator mixture comprising 1 g of 2,2'-azobis(2-amidinopropane) dihydrochloride and 20 g of water was added in one portion at this temperature. After stirring for a further two hours at 80° C., the reaction mixture was cooled to room temperature.

This gave a 20.3% strength by weight polymer solution with a K value of 25.5.

Copolymer 2

A mixture of 426.7 g of water and 16.3 g of N-vinylimidazole was initially introduced into a 2 l polymerization vessel fitted with stirrer, reflux condenser, internal thermometer and 4 dropping funnels and, after flushing with nitrogen, heated to 80° C. 346.5 g of a 50% strength by weight aqueous solution of methylpolyethlene glycol methacrylate ($M_n$ 1000) (feed 1), a mixture of 10.5 g of N-vinylpyrrolidone and 100 g of water (feed 2), 100 g of a 4% strength by weight aqueous sodium disulfite solution (feed 3) and an initiator mixture of 4.0 g of 2,2'-azobis(2-amidinopropane) dihydrochloride and 80 g of water (feed 4) were then continuously added dropwise (feed 1, 2 and 3 in 3 h, feed 4 in 4 h). When the initiator addition was complete, the reaction mixture was stirred for a further 1 h at 80° C., then another initiator mixture comprising 1 g of 2,2'-azobis(2-amidinopropane) dihydrochloride and 20 g of water was added in one portion at this temperature. After stirring for a further two hours at 80° C., the reaction mixture was cooled to room temperature.

This gave a 20.3% strength by weight polymer solution with a K value of 30.3.

Copolymer 3

230 g of standard commercial pH7 phosphate buffer were initially introduced into a 2 l polymerization vessel fitted with stirrer, reflux condenser, internal thermometer and 3 dropping funnels and, after flushing with nitrogen, heated to 80° C. 540.0 g of a 50% strength by weight aqueous solution of methylpolyethylene glycol methacrylate ($M_n$ 1000) (feed 1), a mixture of 30.0 g of N-vinylpyrrolidone and 100 g of water (feed 2) and an initiator mixture of 6.0 g of 2,2'-azobis(2-amidinopropane) dihydrochloride and 80 g of water (feed 3) were then continuously added dropwise (feed 1 and 2 in 3 h, feed 3 in 4 h). When the initiator addition was complete, the reaction mixture was stirred for a further 1 h at 80° C., then another initiator mixture comprising 1.5 g of 2,2'-azobis(2-amidinopropane) dihydrochloride and 20 g of water was added in one portion at this temperature. After stirring for a further two hours at 80° C., the reaction mixture was cooled to room temperature.

This gave a 31.4% strength by weight polymer solution with a K value of 25.5.

II. Use of Copolymers According to the Invention

The soil-dispersing effect of the resulting copolymers was tested by reference to the removal of tea and grass stains from cotton fabrics. For this, the commercial standard cotton test fabric EMPA 164 (grass on cotton) and EMPA 167 (tea on cotton) were used.

All of the washing experiments were carried out at 40° C. and a water hardness of 3 mmol of $Ca^{2+}$/l, Ca:Mg ratio 3:1. All of the washing cycles lasted 30 min.

Example 1

A solution of in each case 1.25 g of the copolymers 1 to 3 in 100 ml of deionized water was adjusted to pH 7 using 0.05 N sodium hydroxide solution.

After measuring the reflectance at 440 nm (EMPA 164) and 480 nm (EMPA 167) using an Elrepho® 2000 photometer (Datacolor), a section from each of the test fabrics (weight 1.25 g) was placed in a Petri dish and saturated using a pipette with in each case 15 g of the polymer solutions obtained. The Petri dish was then sealed and left to stand in the dark for 24 h at room temperature.

Thereafter, the treated test fabrics were washed in a Launder-O-meter with 250 ml of a wash liquor which comprised 3.5 g/l of a standard commercial liquid detergent (Ariel Liquid). After rinsing and drying, the reflectance of the test fabrics was measured again.

For comparison, the reflectance of test fabrics for which all of the process steps were carried out, but without the addition of copolymers 1 to 3, was measured.

The ΔR values (difference between reflectance prior to washing and reflectance after washing) obtained in each case are listed in the table below.

Example 2

The procedure was analogous to that in example 1, except that 50 mg of Trilon® A (nitrilotriacetic acid sodium salt) were added in each case to the polymer solution.

The ΔR values obtained in each case are listed in the table below.

Example 3

The procedure was analogous to example 1, except that 50 mg of protease (Savinase®, manufacturer Novo Nordisk) were added in each case to the polymer solution.

The ΔR values obtained in each case are listed in the table below.

Example 4

The liquid detergents comprising copolymers 1 to 3 were prepared by mixing 95 ml of standard commercial liquid detergent (Ariel Liquid) with in each case 5 ml of a 25% strength by weight solution of the copolymer 1, 2 or 3 in deionized water.

The test fabric was then pretreated analogously to example 1 using 0.8 g of each of the liquid detergents obtained, and washed using 250 ml of a wash liquor which comprised 3.5 g/l of Ariel Liquid.

The ΔR values obtained analogously to example 1 are listed in the table below.

TABLE

|  |  | ΔR (EMPA 164) | ΔR (EMPA 167) |
|---|---|---|---|
| Example 1 | Copolymer 1 | 18.4 | 3.5 |
| Example 1 | Copolymer 2 | 18.6 | 4.3 |
| Example 1 | Copolymer 3 | 16.7 | 4.9 |
| Example 1 | without polymer | 15.2 | 3.0 |
| Example 2 | Copolymer 1 |  | 8.6 |
| Example 2 | Copolymer 2 |  | 9.8 |
| Example 2 | Copolymer 3 |  | 11.3 |
| Example 2 | without polymer |  | 7.6 |
| Example 3 | Copolymer 1 | 23.4 |  |
| Example 3 | Copolymer 2 | 25.1 |  |
| Example 3 | Copolymer 3 | 22.1 |  |
| Example 3 | without polymer | 21.7 |  |
| Example 4 | Copolymer 1 | 8.8 | 11.5 |
| Example 4 | Copolymer 2 | 10.2 | 12.2 |
| Example 4 | Copolymer 3 | 9.8 | 11.9 |
| Example 4 | without polymer | 8.3 | 10.7 |

We claim:

1. A water-soluble copolymer which consists essentially of, in copolymerized form,
   (a) 60 to 99% by weight of at least one monoethylenically unsaturated polyalkylene oxide monomer of the formula I

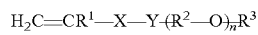

wherein the variables have the following meanings:
   X is —$CH_2$— or —C(O)—, if Y is —O—;
   is —C(O)—, if Y is —NH—;
   is —O— or —O—($CH_2$)$_4$—, if Y is a chemical bond;
   Y is —O—, —NH— or a chemical bond;
   $R^1$ is hydrogen or methyl;
   $R^2$ is $C_2$-$C_4$-alkylene radicals, which may be identical or different and also linear or branched, but where at least 50% of the radicals $R^2$ are ethylene;
   $R^3$ is $C_1$-$C_4$-alkyl, phenyl, p-($C_1$-$C_{12}$-alkyl)phenyl or hydrogen;
   n is an integer from 6 to 50;

(b) 1 to 40% by weight of at least one nonquaternized dipolar monomer comprising at least one nitrogen atom and chosen from the group of N-vinylpyrrolidones, N-vinylimidazoles, N-vinylcaprolactams, vinylpyridines, N-vinylformamides, N-vinylacetamides, basic (meth)acrylic esters and (meth)acrylamides;

(c) 0 to 39% by weight of other nonionic monoethylenically unsaturated monomers; and (d) 0 to 10% by weight of other anionic monoethylenically unsaturated monomers;

has an average molecular weight $M_w$ of from 2000 to 500 000 D, and has a glass transition temperature of from −62° C. to −48° C.

2. The copolymer according to claim 1, which comprises, in copolymerized form, as monomer (a), at least one monomer of the formula (I) in which the variables have the following meanings:

X is —C(O)—;
Y is —O— or —NH—;
$R^1$ is hydrogen or methyl;
$R^2$ is ethylene;
$R^3$ is methyl or hydrogen; and
n is an integer from 15 to 25.

3. The copolymer according to claim 1, which comprises, in copolymerized form, 90 to 95% by weight of monomer (a), 5 to 15% by weight of monomer (b), 0 to 15% by weight of monomer (c) and 0 to 2.5% by weight of monomer (d).

4. The copolymer according to claim 1, which has an average molecular weight $M_w$ of from 4000 to 60 000 D.

5. Dispersants and sequestrants for pigmented materials comprising the copolymers according to claim 1.

6. The dispersants and sequestrants according to claim 5, wherein the pigmented materials are pigment-containing soiling.

7. An additive for detergents, laundry pretreatment agents, cleaning compositions for hard surfaces, dentifrices and bodycare compositions comprising the copolymers according to claim 1.

8. Auxiliaries for textile processing, paper making and paper processing and deinking processes comprising the copolymers according to claim 1.

9. A liquid detergent formulation comprising:
(A) 0.05 to 20% by weight of at least one copolymer according to claim 1;
(B) 0.5 to 40% by weight of at least one nonionic, anionic and/or cationic surfactant;
(C) 0 to 20% by weight of an inorganic builder;
(D) 0 to 10% by weight of an organic cobuilder;
(E) 0 to 60% by weight of other ingredients, which comprise sodium carbonate, enzymes, perfumes, complexing agents, corrosion inhibitors, bleaches, bleach activators, bleach catalysts, color transfer inhibitors, graying inhibitors, soil release polyesters, fiber and color protection additives, silicones, dyes, bactericides, organic solvents, solubility promoters, hydrotropes, thickeners and/or alkanolamines; and
(F) 0 to 99.45% by weight of water.

10. A solid detergent formulation comprising:
(A) 0.05 to 10% by weight of at least copolymer according to claim 1;
(B) 0.5 to 40% by weight of at least one nonionic, anionic and/or cationic surfactant;
(C) 0.5 to 50% by weight of an inorganic builder;
(D) 0 to 10% by weight of an organic cobuilder; and
(E) 0 to 60% by weight of other ingredients, which comprise extenders, enzymes, perfume, complexing agents, corrosion inhibitors, bleaches, bleach activators, bleach catalysts, color transfer inhibitors, graying inhibitors, soil release polyesters, fiber and color protection additives, silicones, dyes, bactericides, dissolution improvers and/or disintegrants,
where the sum of components (A) to (E) is 100% by weight.

11. A water-soluble copolymer, which comprises: in copolymerized form,
(a) 60 to 99% by weight of at least one monoethylenically unsaturated polyalkylene oxide monomer of the formula I

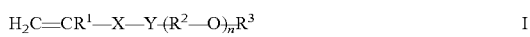

wherein the variables have the following meanings:
X is —CH$_2$—, if Y is —O—;
is —C(O)—, if Y is —NH—;
is —O— or —O—(CH$_2$)$_4$—, if Y is a chemical bond;
Y is —O—, —NH— or a chemical bond;
$R^1$ is hydrogen or methyl;
$R^2$ is C$_2$-C$_4$-alkylene radicals, which may be identical or different and also linear or branched, but where at least 50% of the radicals $R^2$ are ethylene;
$R^3$ is C$_1$-C$_4$-alkyl, phenyl, p-(C$_1$-C$_{12}$-alkyl)phenyl or hydrogen;
n is an integer from 6 to 50;
(b) 1 to 40% by weight of at least one nonquaternized dipolar monomer selected from the group of N-vinylpyrrolidones and N-vinylimidazoles;
(c) 0 to 39% by weight of other nonionic monoethylenically unsaturated monomers; and
(d) 0 to 10% by weight of other anionic monoethylenically unsaturated monomers;
has an average molecular weight $M_w$ of from 2000 to 500 000 D, and has a glass transition temperature of from −62° C. to −48° C.

12. A water-soluble copolymer which consists essentially of, in copolymerized form,
(a) 60 to 99% by weight of at least one monoethylenically unsaturated polyalkylene oxide monomer of the formula I

wherein the variables have the following meanings:
X is —CH$_2$— or —C(O)—, if Y is —O—;
is —C(O)—, if Y is —NH—;
is —O— or —O—(CH$_2$)$_4$—, if Y is a chemical bond;
Y is —O—, —NH— or a chemical bond;
$R^1$ is hydrogen or methyl;
$R^2$ is C$_2$-C$_4$-alkylene radicals, which may be identical or different and also linear or branched, but where at least 50% of the radicals $R^2$ are ethylene;
$R^3$ is C$_1$-C$_4$-alkyl, phenyl, p-(C$_1$-C$_{12}$-alkyl)phenyl or hydrogen;
n is an integer from 6 to 50;
(b) 1 to 40% by weight of at least one nonquaternized dipolar monomer comprising at least one nitrogen atom and chosen from the group of N-vinylpyrrolidones, N-vinylimidazoles, N-vinylcaprolactams, vinylpyridines, N-vinylformamides, N-vinylacetamides, basic (meth)acrylic esters and (meth)acrylamides;
(c) 0 to 39% by weight of other nonionic monoethylenically unsaturated monomers; and
(d) 0 to 10% by weight of other anionic monoethylenically unsaturated monomers;
has an average molecular weight $M_w$ of from 4000 to 60 000 D, and has a glass transition temperature of from −62° C. to −48° C.

* * * * *